United States Patent
Kasperkiewicz et al.

(10) Patent No.: US 7,336,817 B2
(45) Date of Patent: Feb. 26, 2008

(54) PROCESSING RAW AND PRE-PROCESSED DIGITAL IMAGES

(75) Inventors: Tomasz S. M. Kasperkiewicz, Redmond, WA (US); Steve J. White, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 354 days.

(21) Appl. No.: 11/156,986

(22) Filed: Jun. 20, 2005

(65) Prior Publication Data
US 2006/0285761 A1 Dec. 21, 2006

(51) Int. Cl.
*G06K 9/00* (2006.01)
(52) U.S. Cl. ............... 382/162; 382/276; 348/231.6; 345/610
(58) Field of Classification Search ............... 382/162, 382/276, 286; 348/145, 166, 207.99; 345/608, 345/609, 610
See application file for complete search history.

(56) References Cited

U.S. PATENT DOCUMENTS

2003/0184812 A1* 10/2003 Minakuti et al. ............ 358/296
2004/0095600 A1* 5/2004 Nitta et al. ................ 358/1.15
2005/0007610 A1* 1/2005 Kawase et al. ............. 358/1.9
2005/0185837 A1* 8/2005 Takano et al. .............. 382/162
2005/0196040 A1* 9/2005 Ohara ......................... 382/167
2005/0212914 A1* 9/2005 Seto et al. ................. 348/207.1

OTHER PUBLICATIONS

Koren, "Color management and color science: Introduction," Apr. 23, 2005, www.normankoren.com.

* cited by examiner

*Primary Examiner*—Samir Ahmed
*Assistant Examiner*—Anand Bhatnagar
(74) *Attorney, Agent, or Firm*—Shook, Hardy & Bacon

(57) ABSTRACT

A unified method for processing Raw and pre-processed digital images is provided. The method may include receiving digital image data and determining if the data is Raw or pre-processed. If the digital image data is Raw, the method may further include receiving modifications to the Raw image data, applying a sensor profile and an output profile to the data to create output-ready digital image data, and outputting the output-ready digital image data. If, on the other hand, the digital image data is pre-processed, the method may further include receiving a sensor profile that has been applied to the pre-processed image data (or a proxy therefore), converting the pre-processed image data to linear image data using the sensor profile, receiving modifications to the linear image data, applying the sensor profile and an output profile to the data to create output-ready digital image data, and outputting the output-ready digital image data.

13 Claims, 5 Drawing Sheets

PROCESSING RAW AND PRE-PROCESSED DIGITAL IMAGES

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND

Digital cameras today are designed to produce usable image files. In order to produce a usable image file, a number of processing steps must occur. These processing steps can occur either on the camera, in which case a finished image file is created (e.g., JPEG), or can be deferred until the image is edited on a computer, in which case a Raw file is created. The finished image file does not require additional processing, so it can be used as soon as it is transferred off of the camera. For this reason, most cameras produce finished images. However, Raw files are becoming more popular with users who demand better image quality.

In both cases the file can be edited on the computer to improve the quality (e.g., exposure, color, sharpness, etc.) and/or to add creative touches (e.g., creative effects such as sepia, addition of borders, addition of text, etc.). However, in the case of the finished image, this processing is necessarily cumulative to the processing already performed on the camera, which can result in lower image quality. In the case of Raw files, no processing has occurred, so the processing can be adjusted from the earliest point. In the current state of the art, this leads to a different user workflow for finished image files than for Raw image files.

Until recently, one of the big advantages that in-camera processing had over computer-based processing was that the Raw sensor data is in a linear color space, i.e., that there exists a linear correlation between the digitized color values and the perceived colors in the image. A linear color space has the advantage that color and exposure corrections are simple to apply and accurate across the entire color space, as more fully described below. This meant that automatic in-camera adjustments could take advantage of the linearity of the color space, whereas all computer-based adjustments had to attempt to reverse engineer the tone-mapping that occurs in the camera. Users, frustrated with this lack of control and consistency, have found a better solution in a relatively new model of image editing-Raw image processing. While it has other advantages beyond the one described hereinabove, for instance, better dynamic range and better suitability as the archival image, one of the biggest advantages of Raw image editing is its easier and more accurate linear image adjustments.

Some higher-end digital cameras available today allow the user to choose to output Raw image data instead of, or in addition to, processed image data (e.g., JPEG). In Raw image processing, the image data is taken directly off of the camera sensor, along with the camera settings, prior to any significant processing being performed by the camera. Thus, Raw image data is unmodified or minimally modified sensor data, typically characterized as linear. The Raw data is subsequently forwarded to a Raw image editing application that produces high-fidelity image edits. Raw image editing applications are fairly easy to use and produce superior results. With Raw image processing, many of the steps utilized with respect to pre-processed image models are skipped, particularly those that take place in the camera itself. Raw image processing is very different than traditional pre-processed image in-camera processing in that the settings and corrections such as exposure, white-point (color) balance, and sharpening are stored with the file and used for processing. None of the processing is done to the stored Raw image itself. The goal of Raw image processing is to save the image data with the minimum amount of processing; indeed to save the digitized sensor data if at all possible.

Raw image editing applications essentially replicate the in-camera processing of pre-processed image editing models. This means that all of the advantages of in-camera processing of pre-processed images (e.g., no degradation due to repeated processing and ability to work in an accurate and easy to manage linear model) are preserved while Raw images are edited and fine-tuned. This closed system is both the strength and weakness of Raw image processing. The ease and quality of the editing for basic adjustments is superb in almost every Raw image editing application available today. However, the design is tightly coupled with the camera design. Each camera model design change drives changes in Raw image processing. Vendors balk at providing full feature support into their editing applications because it's not their core business and because of the complexity of adding in features like combining images, creative input, and preparation for print or press. Many core features, like printing, text, and image composition, are simply not provided.

Composition of images would be extremely problematic with this model anyway. For instance, how would a user compose another image from another camera with this model? Or how would a user combine a post-processed image with a pre-processed one? Basically, Raw image editing applications are generally treated as (yet another) preparation step inserted into the workflow before traditional image editing applications described above. That is, the output of the Raw image editing application is just another input into the traditional image editing application and Raw image processing becomes more work, not less. The quality benefits still accrue, but there is a significantly greater complexity. This, along with the proliferation of non-compatible and redundant Raw image editing models, is a significant impediment to adoption of a Raw image processing model by anyone other than the most dedicated and patient practitioners.

One potential improvement to Raw image processing models to make them less cumbersome to users would be to combine (end-to-end) a Raw image editing application and a traditional image editing application into one application the way that many Raw image processing users do manually today using two separate applications. When users want to adjust color or exposure, they can edit the Raw part of the model and when they want to do traditional pre-processed image editing (e.g., compositing, vector and text editing, printing, and the like) they can use the pre-processed image model with its unified "working or output" color model.

While this may seem a viable approach, it is sub-optimal for a number of reasons. First, it's confusing for users to have to understand when they are working in one model or the other. For instance, how would a user combine images from different cameras or from one camera and a traditional source like a JPEG? Or how would a user leverage the expertise of a camera manufacturer's Raw image processing model and a software vendor's pre-processed image editing and creative tools in one application? Pasting the two models together does not address these issues.

Perhaps the biggest barrier to unifying the pre-processed and Raw image processing models, however, is that while the workflows appear to be similar-they both have exposure and color correction steps, for example-the tools and underlying technology are actually completely different. Each of them produces different results using different processing algorithms. In fact, Raw image processing corrections often don't look the same as edits made in a processed image editing application.

Accordingly, a method for unifying image editing for both Raw and pre-processed images would be desirable. Additionally, a method for merging the disparate image processing models of Raw and pre-processed image editing into a largely unified design that can deal interchangeably with Raw and pre-processed or linear data using common tools and workflow would be advantageous.

SUMMARY

Embodiments of the present invention relate to the unified processing of Raw and/or pre-processed digital image data. In various embodiments hereof, such unified processing includes utilizing a "sensor profile", that is a model for modifying image data from a Raw state to a processed state (or vice versa) at the end of the processing pipeline along with one or more output profiles to map the data to targeted output files and/or devices. Various embodiments hereof further permit the mapping, utilizing the sensor profile, of additional image data, such as composited images, to match the Raw (linear) image color space. When processing pre-processed digital image data, embodiments hereof additionally may include mapping the incoming (processed image) to the linear Raw space using the sensor profile.

BRIEF DESCRIPTION OF THE SEVERAL VIEWS OF THE DRAWING

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide a unified method and system for processing Raw and/or pre-processed digital images. An exemplary operating environment for embodiments of the present invention is described below.

Figure 1:
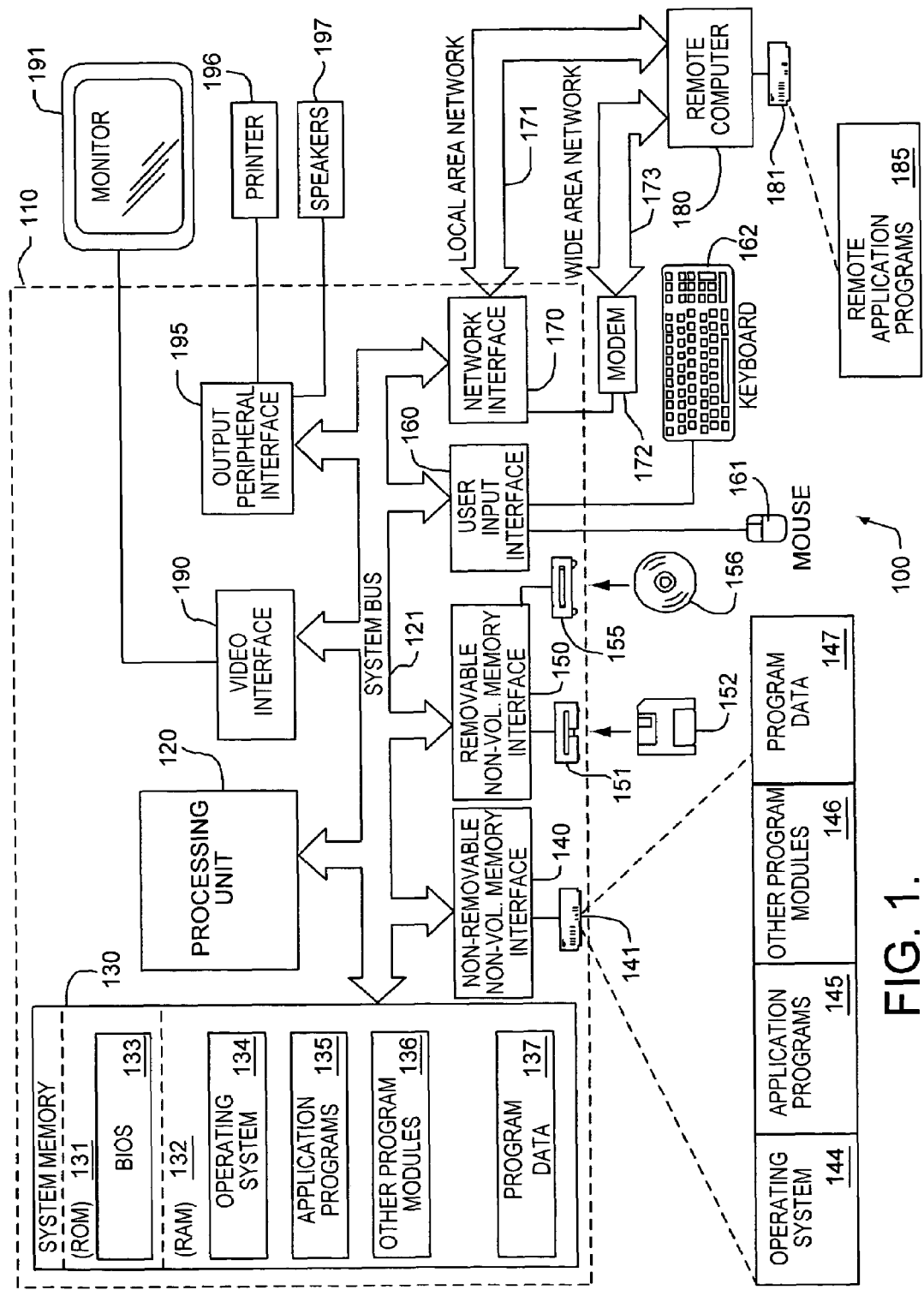
FIG. 1 is a block diagram of an exemplary computing environment suitable for use in implementing the present invention.

Referring to the drawings in general and initially to FIG. 1 in particular, wherein like reference numerals identify like components in the various figures, an exemplary operating environment for implementing the present invention is shown and designated generally as computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the present invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system (BIOS) 133, containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks (DVDs), digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other programs 146 and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the network interface 170, or other appropriate mechanism. In a networked environment, program modules depicted relative to the computer 110, or portions thereof, may be stored in a remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

When the computer 110 is turned on or reset, the BIOS 133, which is stored in the ROM 131, instructs the processing unit 120 to load the operating system, or necessary portion thereof, from the hard disk drive 141 into the RAM 132. Once the copied portion of the operating system, designated as operating system 144, is loaded in RAM 132, the processing unit 120 executes the operating system code and causes the visual elements associated with the user interface of the operating system 134 to be displayed on the monitor 191. Typically, when an application program 145 is opened by a user, the program code and relevant data are read from the hard disk drive 141 and the necessary portions are copied into RAM 132, the copied portion represented herein by reference numeral 135.

Figure 2:
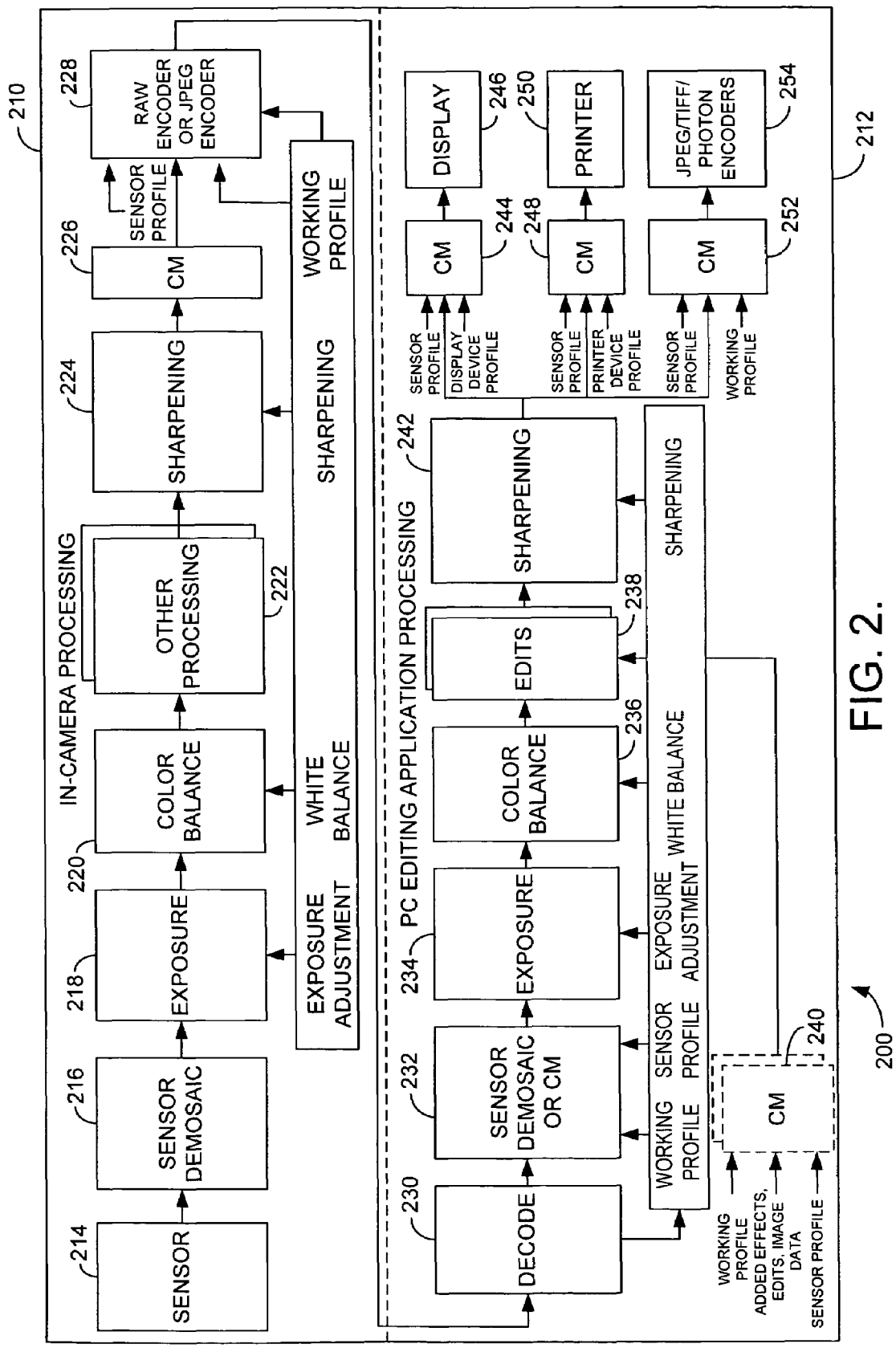
FIG. 2 is a schematic diagram which illustrates an exemplary Raw and/or pre-processed image processing model in accordance with an embodiment of the present invention.

As previously mentioned, embodiments of the present invention relate to a system and method for the unified processing of Raw and pre-processed digital images. Turning to FIG. 2, a schematic diagram is shown which illustrates an exemplary Raw and/or pre-processed image processing model 200 in accordance with an embodiment of the present invention. The image processing model 200 includes in-camera processing 210 and editing application processing 212. It will be understood and appreciated by those of ordinary skill in the art that various modules of the exemplary image processing model 200 may be skipped, depending on whether the digital image data being processed is Raw digital image data or pre-processed digital image data, as more fully described below. (Note that the arrows in FIG. 2 represent data flow through the model.)

Initially, upon capture of an image, a camera sensor 214 receives photonic image data. If the image data received is from a Raw image data source, the photonic image data (along with the camera settings) is subsequently stored in a Raw encoder, as indicated at block 228 for input into a unified image editing application 212 in accordance with the present invention. Thus, if image data received by the sensor 214 is from a Raw image data source, each of blocks 216, 218, 220, 222, 224, and 226 may be skipped. "Raw image data", as the term is utilized herein, may be defined as unmodified or minimally modified sensor data, typically characterized as linear.

However, if the photonic image data received is from a pre-processed image data source, the photonic image data received by the sensor 214 is subsequently input into a sensor de-mosaic module 216. Sensors today typically capture photonic image data utilizing an intensity sensor having a color matrix of filters overlayed thereupon (e.g., a Bayer matrix). This grid of colors may be referred to as a mosaic. As the sensor itself is a monochromatic sensor, it measures only one value per pixel position, thus creating a single channel image. However, to output color images, three values are required at each pixel position (e.g., red, green, and blue). Thus, once photonic image data is received from a pre-processed image data source, it is input into a sensor de-mosaic module 216 wherein the data is interpolated according to the mosaic pattern to create three values at each pixel position, i.e., a three-channel image.

Next, the data is input into various processing modules for processing of the image data. More particularly, exposure may be adjusted utilizing exposure module 218, white balance may be adjusted utilizing color balance module 220, other processing (e.g., tone corrections, noise reduction, and the like) may be performed using other processing module 222, and/or sharpening may be performed using sharpening module 224. Each of these processing functions is known and understood by those of ordinary skill in the art and is, accordingly, not further described herein. It will be understood and appreciated by those of ordinary skill in the art that the order in which the various processing modules illustrated in FIG. 2 (modules 218, 220, 222, and 224) process the data is merely exemplary as these processing steps may occur in any order. Additionally, any one or more of processing modules 218, 220, 222, and 224 may be skipped if it is determined that the adjustments capable of being made thereby are unnecessary. Still further, processing such as sharpening and noise reduction may occur prior to the photonic image data being input into the sensor de-mosaic module 216, if desired. All such variations are contemplated to be within the scope of the present invention.

Subsequently, the thus-processed image data may be input into a Color Management (CM) module 226. A CM module modifies the image data from Raw to processed or vice-versa. In addition to the image data, also input into the CM module 226 are a sensor profile and a working or output profile. Some camera manufacturers use the CM module 226 to apply a film-like characteristic to the camera sensor that makes a pleasing image, and sort of "brands" images output therefrom as originating in a camera manufactured by the particular manufacturer. Thus, the sensor profile is a characteristic profile or set of profiles that maps colors to be output from one particular color to another, and can be used to create a distinctive look. Thus, sensor profiles, like CM modules, are a model for modifying image data from Raw to processed (or vice-versa) and are necessary for a user to view an image on their screen, LCD, or the like. Sensor profiles are camera and/or manufacturer specific. This mapping is typically non-linear, i.e., the distance between color values in the sensor profile is different than the distance between color values in the working profile. As more fully described below, once a sensor profile has been applied to an image, it is impractical (if not impossible) to perform high-quality exposure adjustments, color corrections, and the like, as the image data is distorted by the non-linear mapping process. Accordingly, pre-processed image data is image data that has been modified in some way, particularly such that it no longer has a linear color profile.

A working or output profile is a color profile that the image data is actually being converted to, that is, it is the color space to be associated with the image (e.g., sRGB, AdobeRGB, etc.). The working or output profile is thus a mapping between a three-dimensional space (XYZ space) and pixel values to be associated with the output image. Thus, the CM module 226 takes two profiles (a sensor profile and a working or output profile) and converts pixels from the source color space (sensor profile) to the target color space (working or output profile) via a well known connection space such as CIE-XYZ or CIE-LAB.

A key characteristic of film is its logarithmic response; each stop—or doubling—of light results in a relatively uniform increment in grain density on the film which results in a uniform step in brightness in the image. Other characteristics of film-such as its response in extreme bright and dark regions of the image-also give the images their unique character. Digital camera images go through a special tone-mapping step to achieve a similar effect. Thus, at the end of the in-camera processing pipeline, the CM module 226 takes the processed image data and the two color profiles, applies the film-like response characteristic to the image (i.e., applies the sensor profile), compresses and converts the image into a standard International Color Consortium (ICC) color profile-such as sRGB or AdobeRGB (i.e., converts the image data to the working or output profile), and saves the image file, typically in a JPEG encoder 228 for input into a pre-processed image editing application 212. It will be understood and appreciated by those of ordinary skill in the art that the image file may be stored as any processed file format with JPEG being used herein by way of example only.

Thus, the in-camera processing 210 of FIG. 2, in part, applies a Gamma curve to the digital image data, which is necessary for a picture to be displayed. If only a Gamma curve was applied, it would be relatively easy to reverse its effects. As soon as other color profile characteristics are introduced, however, reversing becomes much more difficult. Categories of characteristics that may be introduced include characteristics which minimize errors while maximizing the number of useable colors (e.g., the human eye can distinguish more mid-tones than shadows or highlights so it makes sense to use more bits to represent mid-tones-causing an inherent non-linearity) and creating a "look" (e.g., one camera manufacturer may prefer a greener look while another may prefer a warmer look).

Absent additional information, developers can use only the associated working or output color profile to map between the image pixels and a well-defined "connection space" such as CIE XYZ or LAB. In such instances, the camera manufacturers need to map pixel values to this calibrated space prior to converting to a Gamma-adjusted working or output space such as AdobeRGB or sRGB. This defeats the camera's non-linear film-like processing and imposes a fixed calibration. Instead, while the output of a camera usually adheres to the gamut criteria specified by the associated output color profile matrix, the cameras intentionally "violate" the linear tone-mapping model to introduce the film-like characteristics. This can either be introduced in the in-camera CM module 226 using color profile Tonal Response (or Reproduction) Curves (TRCs), i.e., sensor profile information, as shown in FIG. 2, or as a separate processing step. Either way, the effect is basically the same-the data is no longer linear and associated ICC profiles no longer map to a known linear space. The significance of this is discussed more fully below.

Whether the source of the image data is a Raw file or a processed file such as JPEG, it is subsequently input into unified image editing application 212. Initially encountered in the unified image editing application 212 is a de-coding module 230 which decompresses the image and converts it to a useable format for the application.

If the input into the unified image editing application 212 is from a Raw file, the data is subsequently input into a sensor de-mosaic module 232 wherein it is filtered through a color matrix or mosaic, as more fully described above with reference to block 216. On the other hand, if the input into the unified image editing application 212 is from a JPEG file, the data is subsequently input into a color management (CM) module 232 which essentially reverse engineers the conversions that took place in CM module 226. More particularly, also input into CM module 232 are the working or output profile and the sensor profile, the same two profiles that were previously input into CM module 226. In CM module 232, the data is converted from the working or output profile back to the sensor profile and then back to a Raw state. Once the data is back to a Raw state, processing of the pre-processed data input into the unified image editing application 212 and any Raw data received by the unified image editing application 212 may be identically processed. Note that the module indicated at block 232 is interchangeable by the unified image editing application 212 depending upon the type of image data input (i.e., Raw or pre-processed).

Regardless of the data input into the unified image editing application 212, once the data has passed through block 232 it is in a unified format. Thus, the image data may subsequently be input into various modifications modules, as necessary and/or desired. More particularly, the data may be input into an exposure module 234, a color balance module 236, and/or a sharpening module 242, each of these modifications modules performing functions similar to corresponding modules 218, 220, and 224. Each of these processing functions is known and understood by those of ordinary skill in the art and is, accordingly, not further described herein. It will be understood and appreciated by those of ordinary skill in the art that the order in which the various processing modules illustrated in FIG. 2 process the data is merely exemplary as these processing steps may occur in any order. Additionally, any one or more of processing modules 234, 236, and 242 may be skipped if it is determined that the adjustments capable of being made thereby are unnecessary. Still further, processing such as sharpening and noise reduction may occur prior to the photonic image data being input into the sensor de-mosaic module 232, if desired. All such variations are contemplated to be within the scope of the present invention.

The unified image editing application 212 additionally includes an editing module 238 for performing a number of additional processing applications, for instance, creative applications like sizing, adding a boarder, adding text, and like. Additionally, the editing module 238 may receive images from different sources (or additional images from the same source), whether Raw or pre-processed. Such images may be output from CM module 240. If the image data is pre-processed data, in addition to the image data, input into CM module 240 are the working or output profile and sensor profile for that data and any added effects of edits desired. The output of the CM module 240 is, thus, in the same format as all other data received by editing module 238.

Once all desired edits have been made, the image data may be forwarded to a CM module 244 for final processing prior to being output to a display device 246, may be forwarded to a CM module 248 for final processing prior to being output to a printing device 250, or may be forwarded to CM module 252 for final processing prior to being output as a JPEG/TIFF/etc. file via encoder 254. Also input into the CM module, whether it be CM module 244, CM module 248, or CM module 252, is the sensor profile. Input into CM module 244 is also the display device profile. Thus, image data forwarded to CM module 244 for final processing will have the sensor profile applied to the data and then will be converted to the display device profile for display on the display device 246. Input into CM module 248 is also the printing device profile. Thus, image data forwarded to CM module 248 for final processing will have the sensor profile applied thereto and then will be converted to the printing device profile for printing by printer 250. Input into CM module 252 is also the working or output profile. Thus, image data forwarded to CM module 252 for final processing will have the sensor profile applied thereto an then will be converted to the working or output profile for saving to, for instance, a JPEG/TIFF/etc. file via encoder 254. Note that if additional image data is input at CM module 240, more than one sensor profile may be applied, each being specific to the image data associated therewith.

The unified image processing model of FIG. 2 includes the essential film-like processing like conventional Raw image editors and, like conventional pre-processed image editors, involves only a single model. Any desired sensor profile may be chosen (including one provided by the camera manufacturer or a third party, one installed as part of the operating system, one accessed from a website, and/or one extracted from the Raw or processed file). In fact, the user may calculate their own sensor profile, e.g., utilizing a personal profile building tool, if desired.

One of the biggest challenges to extending traditional Raw image processing models is that the images, being in the sensor native color space are not normalized into a common color space suitable for combining with other images. If another image from the same sensor is introduced, the results would be compatible since the color profile for the images would be consistent. When dealing with other camera model images or images encoded in the sRGB or other common working spaces, however, combining these images would be a challenge as the user would have to make decisions regarding which "working profile" to use and how to apply it.

Casting all image data to one of the traditional prototypical display device working or output space would land the user back where s/he started with the conventional pre-processed image editing models. There a couple of problems with this approach. First, imposition of non-linearities associated with traditional working profiles such as AdobeRGB and sRGB is not desirable. Second, additional data is necessary to enable mapping of the sensor data to the connection space prior to mapping to any working profile.

One key to addressing these issues in accordance with embodiments of the present invention is in the sensor profile. In addition to the problematic film-like TRC data, the sensor profile also includes the sensor to XYZ calibration matrix. With this data, images from other sensors or from standard working or output spaces may be combined. Thus, the following three composition scenarios are possible. First, when combining images from the same sensor, the images would simply be combined linearly and the sensor profile would be used at the end of the pipeline to map to the target devices or working spaces (or leave intact to save as a Raw image). Second, when combining images from different sensors, at any point up to and including the blending step, one or both images may be converted to a common linear color space by matrix mapping. The "base" image (i.e., the first loaded image) or a subsequent image, or a linear working profile such as scRGB may then be chosen. With adequate numerical precision in the pipeline buffers, the latter approach may be desirable to establish a common working profile. For restricted precision such as 16-bit integer, it may be desirable to keep it in one of the original image profile spaces.

The third possible composition scenario involves combining images with device characteristic profiles such as sRGB or AdobeRGB. These images may be converted to the linear working space of the pipeline before mixing.

For all of the above composition scenarios, an independent software or hardware vendor implementing the unified image processing model shown in FIG. 2 may choose to always convert to a good linear working space such as scRGB that basically has a Gamma of 1.0 (i.e., is linear) and is calibrated roughly to the sRGB space but has a huge dynamic range and gamut.

The biggest problem of traditional image editing applications is any source of non-linearity, e.g., tone mapping (although some well-defined profiles are more easily reversible than others). The ingredient needed to map the image back to the linear model of the sensor data is a camera profile with the camera's film-like tone-mapping curve set (i.e., the sensor profile information). There are a number of potential sources for this curve set; some available today and some which may be incorporated into future cameras, applications, platforms and/or file formats. First, the sensor profile may be embedded or associated with the image file (e.g., JPEG or TIFF). This is a desirable approach as each camera manufacturer could be sure that the image would be handled in exactly the same way on any platform in accordance with the embodiments of the present invention. This embedding is not to be confused with the embedded working or output profile (e.g., sRGB or AdobeRGB) as both are necessary to completely convert back to the Raw sensor space (see, CM module 232 of FIG. 2).

Secondly, if only the working or output profile is embedded in the file, then the user (or application) may select the appropriate profile from a set installed on the platform. A number of independent software vendors use this strategy today. Camera manufacturers could use this as an alternative to the above-described strategy as well. Additionally, third-parties could design custom "film" curves for one or more camera models as a business model. This would be the mechanism to consume these proprietary value-added "film" profiles.

Third, a simple generic profile exists for use in the absence of the above-described proprietary designs to allow models in accordance with embodiments of the present invention to work in a linear space with or without a specific profile for the device.

Using CM module 232 to map image data both out of its Gamma-adjusted working or output and back-out the film-like response through use of the TRC curves in the sensor profile, the data may be returned to the linear or very nearly linear mode of the original sensor data. Note that the matrix component of the sensor profile usually correctly maps sensor spectra to XYZ, as would be expected from an ICC profile-much unlike the TRC curves which introduce non-linearities. A simple modification to the sensor profile matrix elements can be exploited to enable processing models in accordance with embodiments of the present invention to map to a common working or output independent of the sensor characteristics. For instance, an identity matrix would keep the data in XYZ. An sRGB, or scRGB matrix would map to those spaces. Any common space can be used in the camera profile matrix entries in lieu of the custom camera mix.

Figure 3:
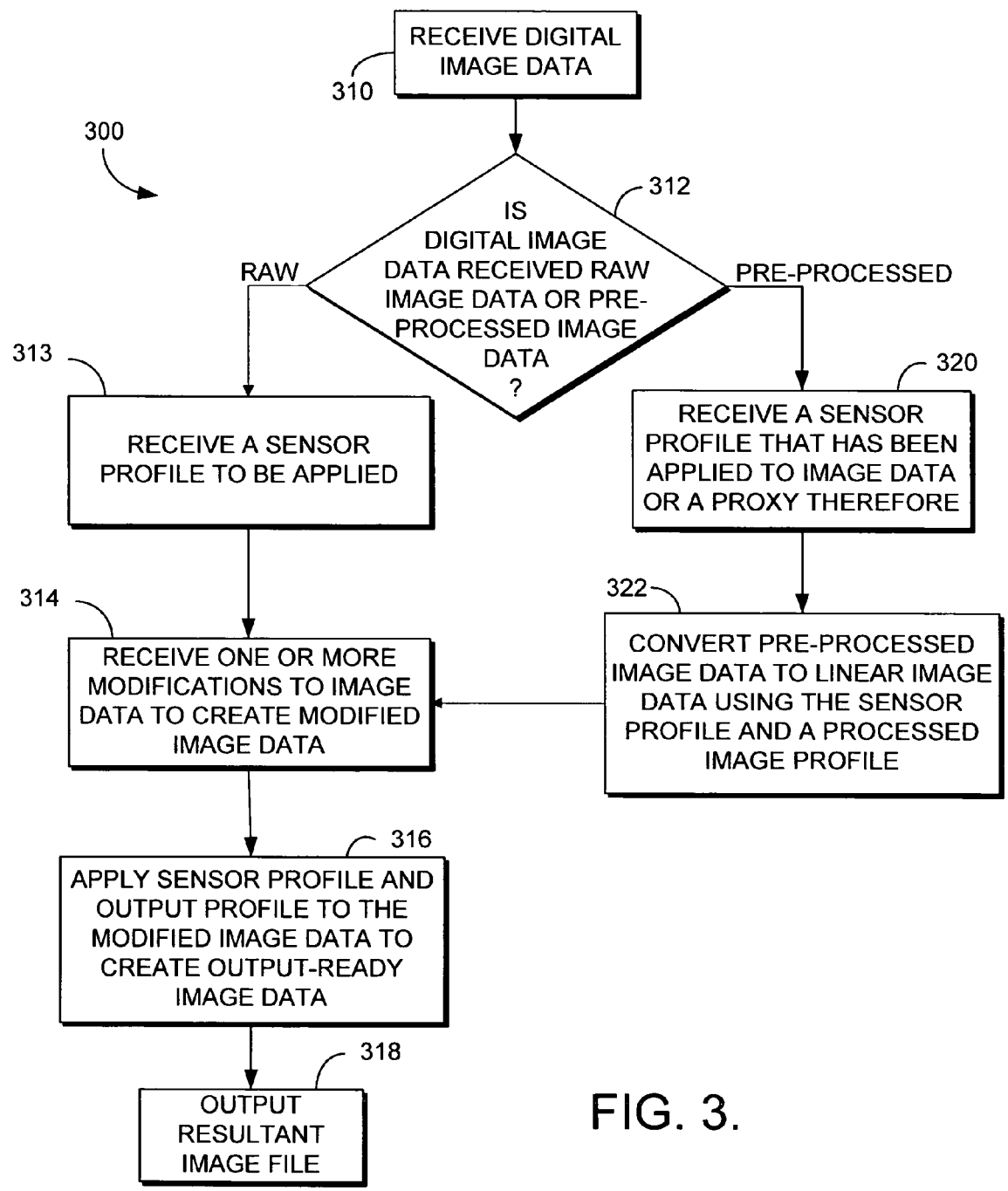
FIG. 3 is a flow diagram illustrating a method for processing Raw and/or pre-processed images in accordance with an embodiment of the present invention.

Once the image data is mapped to a common linear working space, all of the settings may be adjusted using the same workflow and controls as were used in the Raw image processing model of FIG. 3. The key difference between the pre-processed image processing model of FIG. 2 and the Raw image processing model of FIG. 3, besides the decoding and color mapping steps, is that the Raw data is, by definition, unaltered sensor data, while the pre-processed data can and will have adjustments already made to it. For some processing steps, such as exposure and simple color balance, it is not usually critical to the accuracy of the adjustment to know in advance what adjustments have already been made to the data. For some adjustments, however, such as color temperature correction, it is important to have process settings available. When the image is processed on the camera, that data may be encoded in the image file, for example, EXIF and other tags included with the image. That data is available to the correction steps-for both Raw and pre-processed image processing models-to insure corrections are accurately applied. The unified processing model of the present invention needs to ensure that the data is kept up to date.

With reference to FIG. 3, a flow diagram is illustrated which shows a method for processing workflow for Raw and/or pre-processed digital image data utilizing the unified model of FIG. 2, the method being designated generally as reference numeral 300. Initially, as indicated at block 310, digital image data is received by the system. Subsequently, it is determined whether the digital image data received is Raw image data or pre-processed image data, as indicated at block 312.

If it is determined that the digital image data received is Raw image data, a sensor profile to be applied to the data is subsequently received, as indicated at block 313, and the data is de-mosaiced to create three values at each pixel position. Next, the system receives one or more modifications to the de-mosaiced image data to create modified image data. This is indicated at block 314. The one or more modifications may include, by way of example only, exposure adjustments, white balance adjustments, sharpening adjustments, creative adjustments, and the like.

Next, the sensor profile and an output profile (e.g., a display device profile, a working profile, and/or a printing device profile) is applied to the modified image data to create output-ready image data, as indicated at block 316 Once the sensor profile and output profile have been applied, the resultant image file may be output to, for instance, a printing device, a display device, or stored in a processed file format such as JPEG, TIFF, or the like, as indicated at block 318.

If, however, it is determined at block 312 that the digital image data received is pre-processed image data, the system subsequently receives a sensor profile that has been applied to the image data during in-camera processing or a proxy therefore that includes a similar mapping to the one applied. This is indicated at block 320. Subsequently, the pre-processed image data is converted to linear image data using the sensor profile and a processed image file, as indicated at block 322.

Next, the system receives one or more modifications to the linear image data to create modified image data, as indicated at block 314. The one or modifications may include, by way of example only, exposure adjustments, white balance adjustments, sharpening adjustments, creative adjustments, and the like.

Subsequently, the sensor profile that had previously been received at block 320 and an output profile (e.g., a display device profile, a working profile, and/or a printing device profile) are applied to the modified image data to create output-ready image data, as indicated at block 316. Once the sensor profile and output profile have been applied, the resultant image file may be output to, for instance, a printing device, a display device, or stored in a processed file format such a JPEG, TIFF, or the like, as indicated at block 318.

Figure 4:
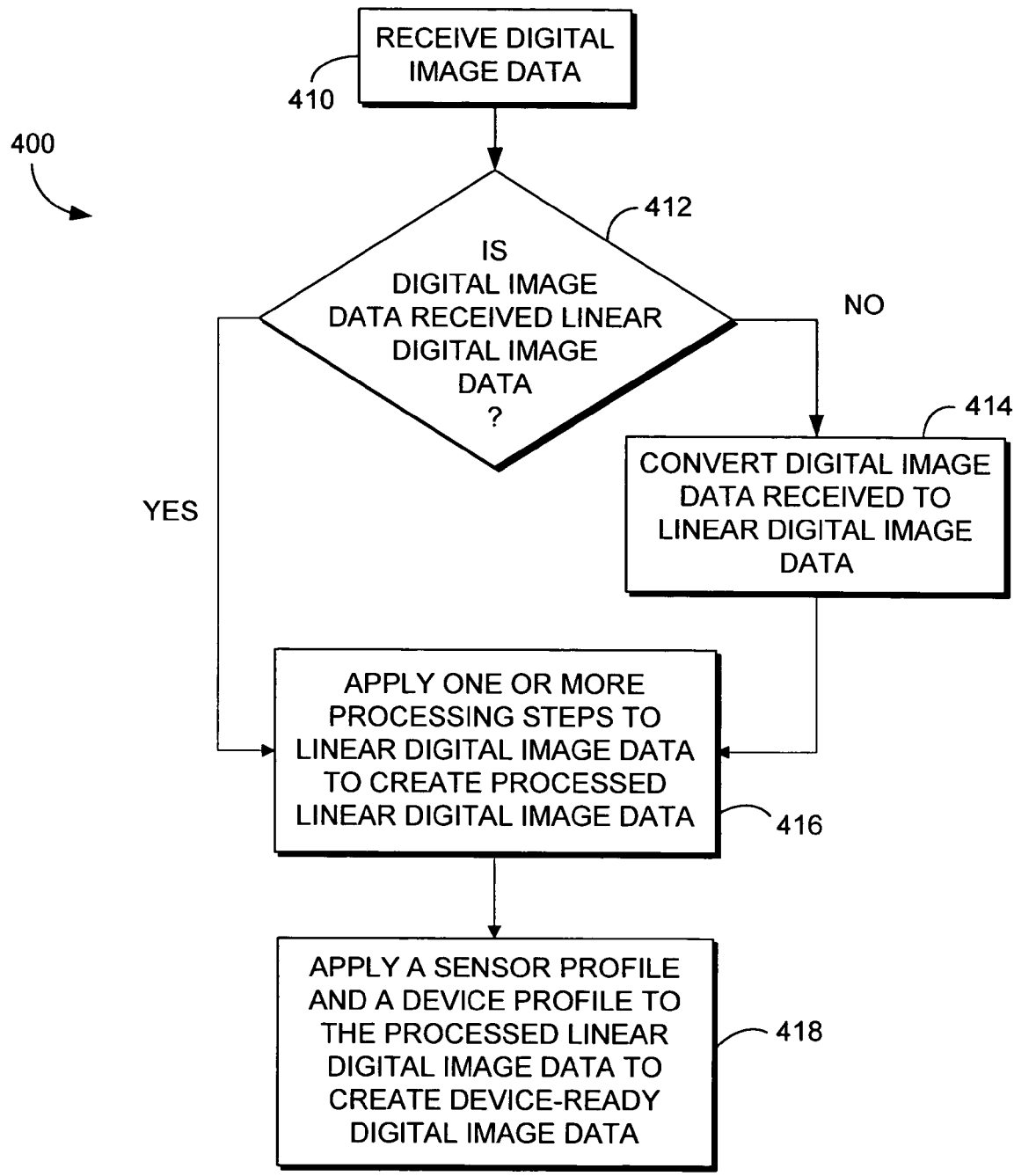
FIG. 4 is a flow diagram illustrating a method for processing Raw and/or pre-processed images in accordance with an embodiment of the present invention.

Turning now to FIG. 4, a flow diagram is illustrated which shows an embodiment of a method for processing workflow for Raw and/or pre-processed digital image data utilizing the unified model of FIG. 2, the method being designated generally as reference numeral 400. Initially, as indicated at block 410, digital image data is received by the system. Subsequently, it is determined whether the digital image data received is linear image data, as indicated at block 412.

If it is determined that the digital image data received is not linear digital image data, the digital image data is converted to linear digital image data, e.g., by applying a color mapping to the digital image data. This is indicated at block 414. Subsequently, or if the digital image data received is determined to be linear digital image data, one or more processing steps are applied to the linear digital image data to create processed linear digital image data, as indicated at block 416. Subsequently, as indicated at block 418, a sensor profile and a device profile are applied to the processed linear digital image data to create device-ready digital image data.

When the file is edited and re-saved, it is important to preserve the "provenance" of the file so subsequent editing sessions in accordance with the methods herein described will have accurate baselines from which to make corrections. This insures that subsequent editing sessions can exploit the same high-fidelity image processing model and get predictable results. Of course, with Raw image editing, the original image is never altered, so subsequent editing sessions may simply use the settings as "presets" on the pipeline.

The unified processing model of the present invention extends this feature to pre-processed image editing. Pre-processed images taken from a camera may be treated as "negatives" and never altered. This is accomplished by first using the settings from the camera as both the process priors and the adjustment settings in the pipeline (resulting in an unaltered output). When the settings like exposure or color are modified, these adjustments to the process settings (see, FIG. 2), are stored alongside the camera settings (pre-process settings). This way, each time the image is opened for viewing or editing, for the first time or the fifth time, the original settings may be restored at will and the previous stored settings may be easily adjusted without degradation.

Figure 5:
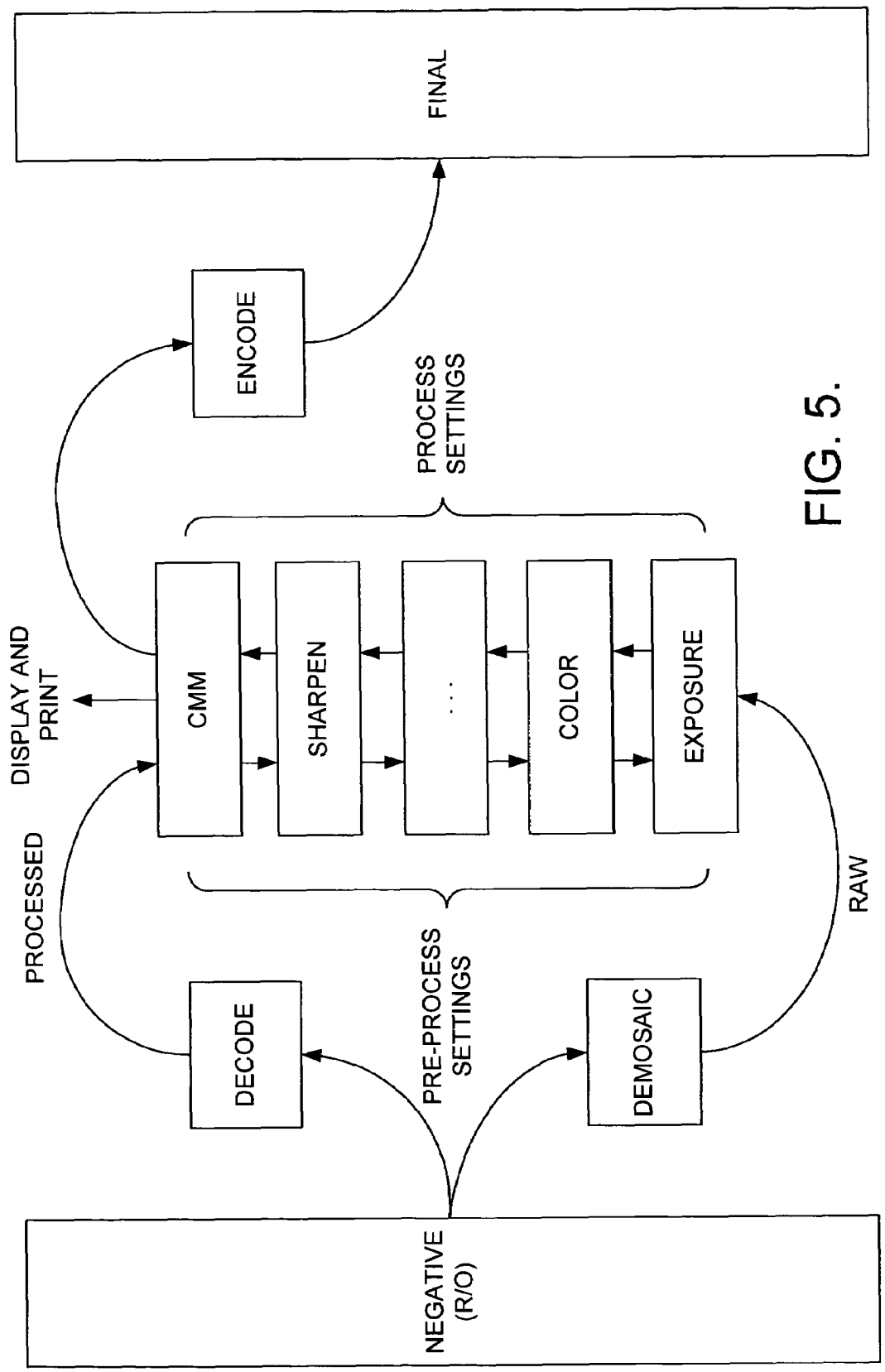
FIG. 5 is a schematic diagram illustrating data flow for a unified image processing model in accordance with an embodiment of the present invention.

With reference to FIG. 5, a simplified schematic diagram illustrating how the unified pipeline of the model of the present invention works with this data is shown. First, the Raw image data is de-mosaiced (e.g., converted to RGB) or the pre-processed image data (e.g., JPEG) is decoded, depending on the file type. If the file has pre-processed data from a camera, the camera processing settings are loaded into both the pre-process inputs for the adjustments and the process settings, in effect leaving the image intact. Any adjustment to these settings will be done to the process settings and stored separate from the camera EXIF settings. Subsequent loads will load camera settings into the pre-processed settings and the stored, modified settings into the process settings. In this way, the original image data and camera settings-that is, the original file from the camera-is left intact. Only the adjustment data (process settings) is altered when stored. At any time, the original camera settings may be reinstated.

FIG. 5 differs from FIG. 2 in one important respect: it shows the pre-processed data path as traversing the pipeline in two directions. This is one implementation which would "reverse" the processing that happened in the camera and return the data to its "Raw" state prior to applying linear-space adjustments. In practice, however, this is largely an unnecessary embellishment to the process shown in FIG. 2. Most steps, once the data is linear, are commutable-they can be left in the original (ascending) order. The re-processing to linear space in the CM step must happen first, however. So, while FIG. 5 is a compact conceptualization of the ideal processing model, FIG. 2 can replicate the processing accurately by simply having two inputs to the adjustments-one for pre-process settings (i.e., the camera settings) and one for the target process settings. Indeed, some, like exposure, technically can simply have one input-the change (delta) in exposure desired.

Raw image processing follows an almost identical scheme as pre-processed data. The camera settings are loaded into the pipeline as process settings (there are no pre-process settings for Raw images) and the image is rendered. Adjustments are made to these settings and stored-as with the above-described pre-processed approach with the file. Just like the pre-processed model, re-opening the file will render the stored process settings and at any time the original camera settings may be reinstated to return to the original slate.

As can be understood, embodiments of the present invention provide a unified method for processing Raw and/or pre-processed digital images. Further embodiments of the present invention provide a unified system for processing Raw and/or pre-processed digital images.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A method for processing at least one of Raw digital image data and pre-processed digital image data, the pre-processed digital image data having a processed image profile associated therewith, the method comprising:
   receiving digital image data;
   determining if the digital image data received is Raw digital image data or pre-processed digital image data;
   receiving a sensor profile, wherein if the digital image data received is determined to be pre-processed digital image data, the method further comprises:
   applying a color mapping to the pre-processed digital image data utilizing the processed image profile and the sensor profile to create linear digital image data;
   applying one or more modifications to the linear image data to produce modified linear digital image data; and
   applying the sensor profile and an output profile to the modified linear digital image data to create output-ready digital image data; and
   receiving additional digital image data;
   determining if the additional digital image data received is linear digital image data;
   if it is determined that the additional digital image data received is not linear digital image data, converting the additional digital image data received to linear digital image data to create additional linear digital image data; and
   compositing the additional linear digital image data with at least one of the linear digital image data and the modified linear digital image data to create composited digital image data.

2. The method of claim 1, wherein the sensor profile is capable of being received from one or more of a camera manufacturer, a third party, an operating system, a file containing the Raw digital image data, a file containing the pre-processed digital image data, a website, and a personal profile building tool.

3. The method of claim 1, wherein applying the sensor profile and the output profile to the modified linear digital image data comprises applying the sensor profile and a display device profile to the modified linear digital image data, and wherein the method further comprises outputting the output-ready digital image data to a display device.

4. The method of claim 1, wherein applying the sensor profile and the output profile to the modified linear digital image data comprises applying the sensor profile and a working profile to the modified linear digital image data, and wherein the method further comprises outputting the output-ready digital image data to a processed file format suitable for storing.

5. The method of claim 1, wherein applying the sensor profile and the output profile to the modified linear digital image data comprises applying the sensor profile and a printing device profile to the modified linear digital image data, and wherein the method further comprises outputting the output-ready digital image data to a printing device.

6. The method of claim 1, wherein if the digital image data received is determined to be Raw digital image data, the method further comprises;
   applying one or more modifications to the Raw digital image data to create modified linear digital image data; and
   applying the sensor profile and an output profile to the modified linear digital image data to create output-ready digital image data; and
   compositing the additional linear digital image data with at least one of the Raw digital image data and the modified linear digital image data to create additional composited digital image data.

7. The method of claim 6, wherein applying the sensor profile and the output profile to the modified linear digital image data comprises applying the sensor profile and a display device profile to the modified linear digital image data, and wherein the method further comprises outputting the output-ready digital image data to a display device.

8. The method of claim 6, wherein applying the sensor profile and the output profile to the modified linear digital image data comprises applying the sensor profile and a working profile to the modified linear digital image data, and wherein the method further comprises outputting the output-ready digital image data to a processed file format suitable for storing.

9. The method of claim 6, wherein applying the sensor profile and the output profile to the modified linear digital image data comprises applying the sensor profile and a printing device profile to the modified linear digital image data, and wherein the method further comprises outputting the output-ready digital image data to a printing device.

10. The method of claim 1, further comprising receiving one or more modifications to the composited digital image data to create modified composited digital image data.

11. The method of claim 10, wherein applying the sensor profile and the output profile to the modified linear digital image data comprises applying the sensor profile and the output profile to the modified composited digital image data.

12. The method of claim 6, further comprising receiving one or more modifications to the additional composited digital image data to create modified additional composited digital image data.

13. The method of claim 12, wherein applying the sensor profile and the output profile to the modified linear digital image data comprises applying the sensor profile and the output profile to the modified additional composited digital image data.

* * * * *